(12) United States Patent
Cong et al.

(10) Patent No.: US 11,815,401 B2
(45) Date of Patent: Nov. 14, 2023

(54) TEMPERATURE CALIBRATION WITH BAND GAP ABSORPTION METHOD

(71) Applicant: Applied Materials, Inc., Santa Clara, CA (US)

(72) Inventors: Zhepeng Cong, San Jose, CA (US); Schubert S. Chu, San Francisco, CA (US); Nyi O. Myo, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 17/743,714

(22) Filed: May 13, 2022

(65) Prior Publication Data
US 2022/0268634 A1 Aug. 25, 2022

Related U.S. Application Data

(63) Continuation of application No. 17/021,411, filed on Sep. 15, 2020, now Pat. No. 11,359,972.

(51) Int. Cl.
*G01J 5/53* (2022.01)
*G01J 5/34* (2022.01)
*G01J 5/80* (2022.01)

(52) U.S. Cl.
CPC . *G01J 5/53* (2022.01); *G01J 5/34* (2013.01); *G01J 5/80* (2022.01)

(58) Field of Classification Search
None
See application file for complete search history.

(56) References Cited

U.S. PATENT DOCUMENTS

| 5,967,661 A | 10/1999 | Renken et al. |
| 6,596,973 B1 | 7/2003 | Donald et al. |
| 6,703,592 B2 * | 3/2004 | Van Bilsen ............ G01J 5/0007 219/486 |
| 7,833,348 B2 | 11/2010 | Wada et al. |
| 8,372,203 B2 | 2/2013 | Chacin et al. |
| 2005/0106876 A1 * | 5/2005 | Taylor, II ................ G01J 5/60 438/689 |
| 2012/0201267 A1 | 8/2012 | Patalay |

(Continued)

FOREIGN PATENT DOCUMENTS

DE 10241147 A1 4/2003
JP 2005530997 A 10/2005
(Continued)

OTHER PUBLICATIONS

International Search Report and Written Opinion dated Oct. 15, 2021 for Application No. PCT/US2021/038622.

*Primary Examiner* — Edwin C Gunberg
(74) *Attorney, Agent, or Firm* — Patterson + Sheridan, LLP (57) ABSTRACT

A method and apparatus for calibration non-contact temperature sensors within a process chamber are described herein. The calibration of the non-contact temperature sensors includes the utilization of a band edge detector to determine the band edge absorption wavelength of a substrate. The band edge detector is configured to measure the intensity of a range of wavelengths and determines the actual temperature of a substrate based off the band edge absorption wavelength and the material of the substrate. The calibration method is automated and does not require human intervention or disassembly of a process chamber for each calibration.

20 Claims, 7 Drawing Sheets

(56) References Cited

U.S. PATENT DOCUMENTS

| | | |
|---|---|---|
| 2017/0103907 A1 | 4/2017 | Chu et al. |
| 2018/0269089 A1 | 9/2018 | Merchant et al. |
| 2019/0062904 A1 | 2/2019 | Hawrylchak et al. |
| 2020/0227243 A1 | 7/2020 | Kim et al. |

FOREIGN PATENT DOCUMENTS

| | | |
|---|---|---|
| KR | 1020180005465 | 1/2018 |
| WO | 1999010718 A1 | 3/1999 |
| WO | 2008003080 A2 | 1/2008 |

* cited by examiner

TEMPERATURE CALIBRATION WITH BAND GAP ABSORPTION METHOD

CROSS-REFERENCE TO RELATED APPLICATIONS

This is a continuation application of U.S. patent application Ser. No. 17/021,411, filed Sep. 15, 2020, which is herein incorporated by reference in its entirety.

BACKGROUND

Field

Embodiments of the present disclosure generally relate to apparatus and methods for semiconductor processing. More particularly, the apparatus and methods disclosed relate to the calibration of temperature sensors within a thermal process chamber.

Description of the Related Art

Semiconductor substrates are processed for a wide variety of applications, including the fabrication of integrated devices and microdevices. During processing, the substrate is positioned on a susceptor within a process chamber. The susceptor is supported by a support shaft, which is rotatable about a central axis. Precise control over a heating source, such as a plurality of heating lamps disposed below and above the substrate, allows the substrate to be heated within very strict tolerances. The temperature of the substrate can affect the uniformity of the material deposited on the substrate.

The temperature of the substrate is measured throughout the deposition process using non-contact temperature sensors. The non-contact temperature sensors are disposed on/through a lid of the thermal process chamber. Over time, the temperature readings of the non-contact temperature sensors drifts due to changes of the conditions of the hardware within the process chamber. Aging of the heating lamps, window coatings, and susceptor affect the temperature measurements over time. Previous calibration methods have used calibration kits which utilize opening of the process chamber and significant down time.

Therefore, a need exists for improved methods and apparatus for calibrating non-contact temperature sensors within thermal process chambers.

SUMMARY

The present disclosure generally relates to apparatus and methods for calibrating pyrometers within an epitaxial deposition chamber. More specifically, the present disclosure relates to the use of band gap edge detectors to determine the temperature of a substrate. A measurement assembly for calibrating pyrometers within a processing chamber according to one embodiment of the present disclosure includes a band edge calibration assembly. The band edge calibration assembly includes a light source positioned to emit a light and a band edge detector disposed adjacent to the light source and positioned to receive the light emitted by the light source. The measurement assembly for calibrating pyrometers within a processing chamber further includes a first pyrometer disposed adjacent to the band edge calibration assembly and positioned to receive a radiation measurement, and a controller connected to each of the light source, the band edge detector, and the first pyrometer. The controller is configured to determine a band edge absorption wavelength from the light received by the band edge detector.

In another embodiment, the an apparatus for substrate processing includes a chamber body, a substrate support disposed within the chamber body, a first transmission member disposed over the substrate support and within the chamber body, a second transmission member disposed below the substrate support and within the chamber body, a lid disposed above the first transmission member, a plurality of lamps disposed between the first transmission member and the lid, a calibration substrate disposed on the substrate support, a radiation source positioned to direct radiation onto or through the calibration substrate; and a band edge calibration assembly disposed on the lid. The band edge calibration assembly includes a band edge detector positioned to receive the radiation from the radiation source after being reflected off of or passing through the calibration substrate. The apparatus for substrate processing further includes a first pyrometer is disposed adjacent to the band edge calibration assembly, and a controller. The controller is configured to irradiate a portion of the calibration substrate using the radiation source, measure a band edge absorption wavelength, measure a first temperature of the calibration substrate using the first pyrometer, determine an actual temperature of the calibration substrate using the band edge absorption wavelength, and calibrate the first pyrometer by comparing the first temperature of the calibration substrate and the actual temperature of the calibration substrate.

In yet another embodiment, a method of calibrating a pyrometer within a process chamber is disclosed. The method of calibrating the pyrometer includes transferring a calibration substrate onto a substrate support within a chamber body, irradiating a portion of the calibration substrate using a light source, measuring a band edge absorption wavelength using a band edge detector, measuring a first temperature of the calibration substrate using a first pyrometer, and determining an actual temperature of the calibration substrate using the band edge absorption wavelength. The first pyrometer is calibrated by comparing the first temperature of the calibration substrate and the actual temperature of the calibration substrate. The calibration substrate is then transferred out of the chamber body.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to apparatus and methods for semiconductor processing, more particularly, to a thermal process chamber. The thermal process chamber includes a substrate support, a first plurality of heating elements disposed over the substrate support, and a measurement assembly disposed within the thermal process chamber to calibrate non-contact temperature sensors. The calibration apparatus and method utilizes a band edge detector to determine the actual temperature of a calibration substrate. The calibration substrate has a known band gap over a range of temperatures. Absorption edge frequency is only dependent upon the material band gap of the calibration substrate and therefore is not affected by changes within the hardware of a process chamber, such as the aging of heat lamps, window coatings, or susceptor. The measurement of the band gap of the calibration substrate is correlated to a temperature measurement and used to calibrate non-contact temperature sensors, such as pyrometers, within the process chamber.

Using the methods described herein, the non-contact temperature sensors is calibrated using an automatic process, which does not use human intervention or the removal of chamber components. The automation of the calibration process reduces downtime, reduces human error, and improves the consistency of the calibration.

A "substrate" or "substrate surface," as described herein, generally refers to any substrate surface upon which processing is performed. Processing includes deposition, etching, and other methods utilized during semiconductor processing. For example, a substrate surface which may be processed includes silicon, silicon oxide, doped silicon, silicon germanium, germanium, gallium arsenide, glass, sapphire, and any other materials, such as metals, metal nitrides, metal alloys, and other conductive or semi-conductive materials, depending on the application. A substrate or substrate surface which may be processed also includes dielectric materials such as silicon dioxide, silicon nitride, organosilicates, and carbon dopes silicon oxide or nitride materials. The substrate itself is not limited to any particular size or shape. Although the embodiments described herein are made with generally made with reference to a round 200 mm or 300 mm substrate, other shapes, such as polygonal, squared, rectangular, curved, or otherwise non-circular workpieces may be utilized according to the embodiments described herein.

Figure 1:
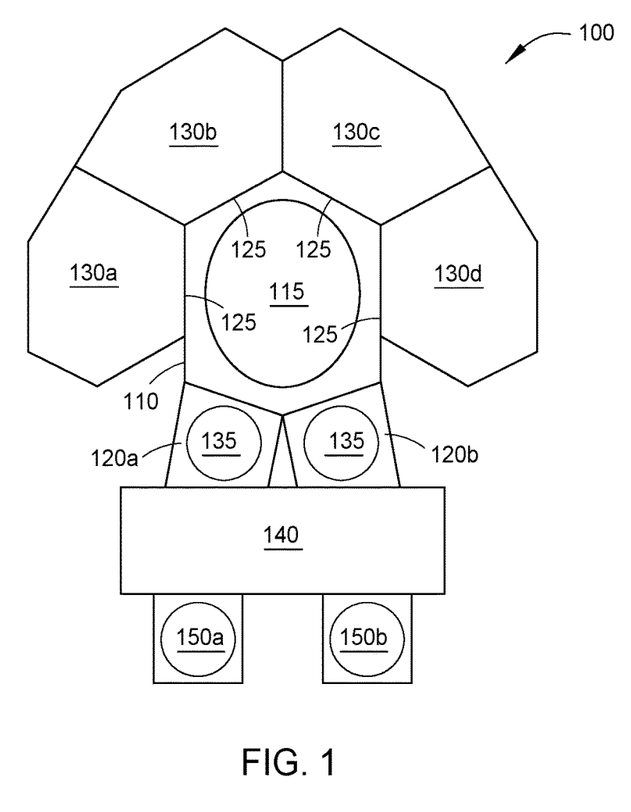
FIG. 1 is a schematic plan view of a substrate processing system, according to one embodiment.

FIG. 1 is a schematic plan view of a substrate processing system 100 which includes the process chamber 130a-d described herein, according to one embodiment. The substrate processing system 100 is used to process semiconductor substrates by performing a variety of processes on the substrates. The substrate processing system 100 described herein includes a transfer chamber 110, a plurality of process chambers 130a-130d, load lock chambers 120a, 120b, a factory interface (FI) 140, and front opening universal pods (FOUPs) 150a,b. The process chambers 130a-d and the load lock chambers 120a, 120b are coupled to the transfer chamber 110. The load lock chambers 120a, 120b are additionally coupled to the FI 140. The FI 140 accepts the FOUPS 150a,b coupled thereto opposite the load lock chambers 120a, 120b. The load lock chambers 120a, 120b include cassettes 135 disposed therein, which are used to store substrates between processing operations. The transfer chamber 110 includes a transfer robot 115 disposed therein. The transfer robot 115 is used to transfer substrates between the process chambers 130a-d and the load lock chambers 120a, 120b.

Each of the process chambers 130a-d includes a loading port 125 disposed adjacent to the transfer chamber 110 through which substrates enter or leave the process chambers 130a-d. The process chambers 130a-d are described in greater detail in FIG. 2. In some embodiments there are four process chambers 130a-d, such that there is a first processing chamber 130a, a second processing chamber 130b, a third processing chamber 130c, and a fourth processing chamber 130d. The transfer chamber 110 is a central chamber, which is configured to transfer substrates within a controlled environment. The transfer chamber 110 is maintained at a constant temperature and pressure. The transfer chamber 110 may be vacuum isolated from each the process chambers 130a-d while substrates are being processed within the process chambers 130a-d.

The load lock chambers 120a, 120b include a first load lock chamber 120a, and a second load lock chamber 120b. The load lock chambers 120a, 120b are disposed between and coupled to both the transfer chamber 110 and the FI 140. Each of the load lock chambers 120a, 120b include a cassette 135. The cassette 135 is shown in greater detail in FIG. 3 and described herein. The cassette 135 holds a plurality of substrates. The substrates are stored in the cassette 135 between processing operations and may be moved by the transfer robot 115.

The FI 140 includes one or more robots (not shown) disposed therein. Substrates are transferred within the FI 140 between the FOUPs 150a,b and the load lock chambers 120a, 120b. The FI 140 is a clean environment and may be held at a constant temperature and pressure different from the transfer chamber 110.

The FOUPs 150a,b include a first FOUP 150a, and a second FOUP 150b. There may be additional FOUPs not shown. The FOUPs 150a,b are used for storing substrates either before or after processing within the process chambers 130a-d.

Figure 2:
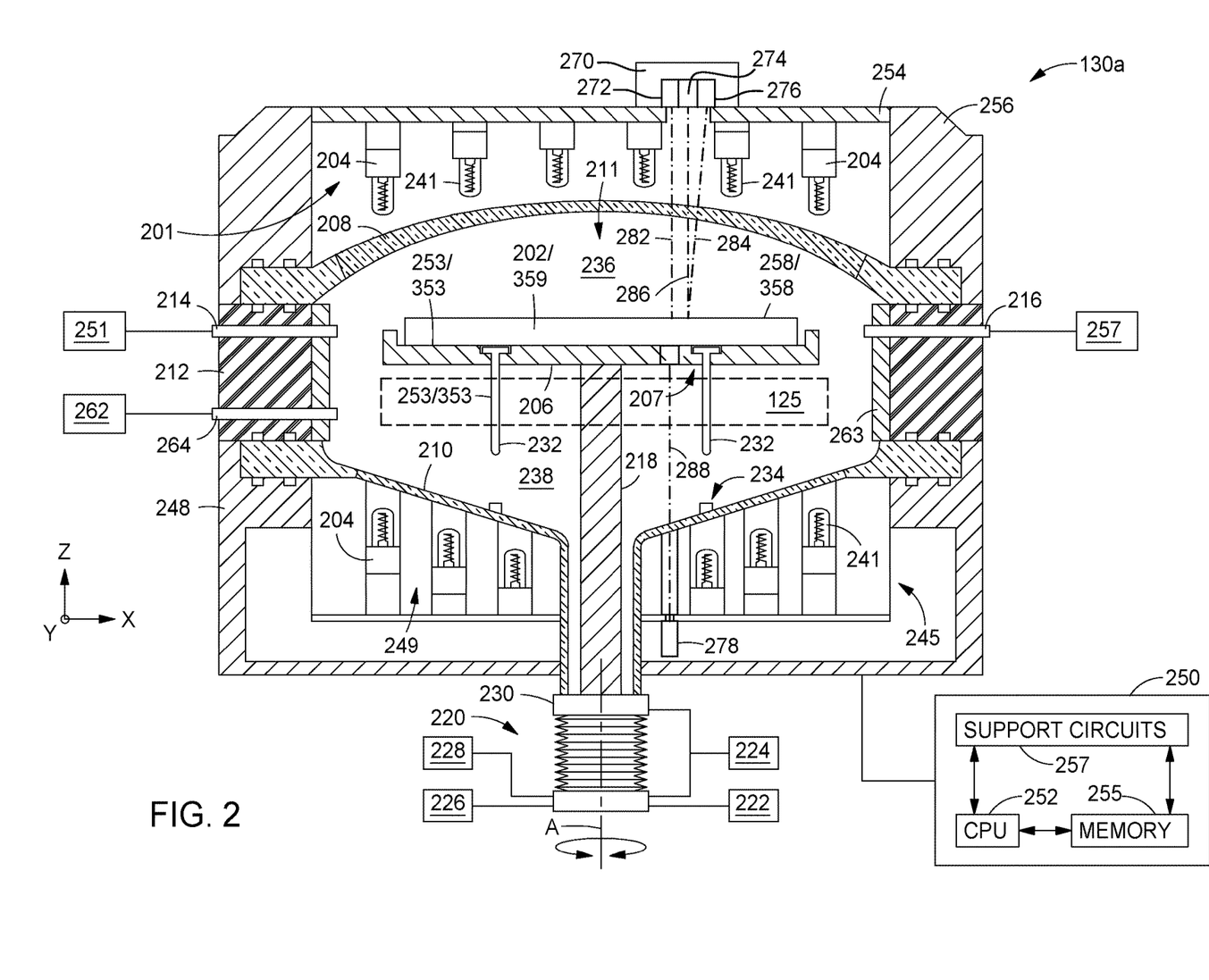
FIG. 2 is a schematic sectional view of a process chamber, according to one embodiment.

FIG. 2 is a schematic sectional view of a process chamber 130a, which includes a measurement assembly 270 described herein, according to one embodiment. The process chamber 130a is the first process chamber, but the second process chamber 130b, the third process chamber 130c, and the fourth process chamber 130d may be similar or the same as the first process chamber 130a. The process chamber 130a may be used as an epitaxial deposition chamber, a rapid thermal process chamber, or other thermal treatment chamber. The process chamber 130a may be used to process one or more substrates, including the deposition of a material on an upper surface of a substrate 202, heating of a substrate 202, etching of a substrate 202, or combinations thereof. The substrate 202 is a device substrate and includes a plurality of partially formed semiconductor devices formed thereon. The substrate 202 may be similar to a calibration substrate 350, which is used in place of the substrate 202.

The process chamber 130a generally includes a chamber body 248, an array of radiant heating lamps 204 for heating, and a susceptor 206 disposed within the process chamber 130a. As shown in FIG. 2, an array of radiant heating lamps 204 may be disposed below the susceptor 206, above the susceptor 206, or both above and below the susceptor 206. The radiant heating lamps 204 may provide a total lamp power of between about 2 KW and about 150 KW. The radiant heating lamps 204 may heat the substrate 202 to a temperature of between about 350 degrees Celsius and about 1150 degrees Celsius. The susceptor 206 may be a disk-like substrate support as shown, or may include a ring-like substrate support (not shown), which supports the substrate from the edge of the substrate, which exposes a backside of the substrate 202 to heat from the radiant heating lamps 204. The susceptor 206 may be formed from silicon carbide or graphite coated with silicon carbide to absorb radiant energy from the lamps 204 and conduct the radiant energy to the substrate 202, thus heating the substrate 202. In some embodiments, the susceptor 206 serves as a radiation source after being heated to an elevated temperature. In such an example, the susceptor 206 serves as a broad-band radiation source and emits a broad range of wavelengths. The susceptor 206 may be at a temperature greater than 350° C., such as between about 350° C. and about 1200° C.

The susceptor 206 is located within the process chamber 130a between a first transmission member 208, which may be a dome, and a second transmission member 210, which may be a dome. The first transmission member 208 and the second transmission member 210, along with a base ring 212 that is disposed between the first transmission member 208 and second transmission member 210, generally define an internal region 211 of the process chamber 130a. Each of the first transmission member 208 and/or the second transmission member 210 may be convex and/or concave and/or planar. In some embodiments, each of the first transmission member 208 and/or the second transmission member 210 are transparent. The first transmission member 208 is disposed between the chamber lid 254 and the susceptor 206. In some embodiments, an array of radiant heating lamps 204 may be disposed outside of the internal region 211 of the process chamber 130a and/or above the first transmission member 208, for example, a region 201 defined between the first transmission member 208 and a chamber lid 254). The substrate 202 can be transferred into the process chamber 130a and positioned onto the susceptor 206 through a loading port 125 formed in the base ring 212. A process gas inlet 214 and a gas outlet 216 are provided in the base ring 212.

The susceptor 206 includes a shaft or stem 218 that is coupled to a motion assembly 220. The motion assembly 220 includes one or more actuators and/or adjustment devices that provide movement and/or adjustment of the stem 218 and/or the susceptor 206 within the internal region 211. For example, the motion assembly 220 may include a rotary actuator 222 that rotates the susceptor 206 about a longitudinal axis A of the process chamber 130a. The longitudinal axis A may include a center of an X-Y plane of the process chamber 130a. The motion assembly 220 may include a vertical actuator 224 to lift and lower the susceptor 206 in the Z direction. The motion assembly 220 may include a tilt adjustment device 226 that is used to adjust a planar orientation of the susceptor 206 in the internal region 211. The motion assembly 220 may also include a lateral adjustment device 228 that is utilized to adjust the positioning of the stem 218 and/or the susceptor 206 side to side within the internal region 211. In embodiments including a lateral adjustment device 228 and a tilt adjustment device 226, the lateral adjustment device 228 is utilized to adjust positioning of the stem 218 and/or the susceptor 206 in the X and/or Y direction while the tilt adjustment device 226 adjusts an angular orientation ($\alpha$) of the stem 218 and/or the susceptor 206. In one embodiment, the motion assembly 220 includes a pivot mechanism 230. As the second transmission member 210 is attached to the process chamber 130a by the base ring 212, the pivot mechanism 230 is utilized to allow the motion assembly 220 to move the stem 218 and/or the susceptor 206 at least in the angular orientation ($\alpha$) to reduce stresses on the second transmission member 210.

The susceptor 206 is shown in an elevated processing position but may be lifted or lowered vertically by the motion assembly 220 as described above. The susceptor 206 may be lowered to a transfer position (below the processing position) to allow lift pins 232 to contact the second transmission member 210. The lift pins 232 extend through holes 207 in the susceptor 206 as the susceptor 206 is lowered, and the lift pins 232 raise the substrate 202 from the susceptor 206. A robot, such as the robot 115, may then enter the process chamber 130a to engage and remove the substrate therefrom though the loading port 125. A new substrate 202 may be loaded onto the lift pins 232 by the robot, and the susceptor 206 may then be actuated up to the processing position to place the substrate 202, with its device side 258 facing up. The lift pins 232 include an enlarged head allowing the lift pins 232 to be suspended in openings by the susceptor 206 in the processing position. In one embodiment, stand-offs 234 coupled to the second transmission member 210 are utilized to provide a flat surface for the lift pins 232 to contact. The stand-offs provide one or more surfaces parallel to the X-Y plane of the process chamber 130a and may be used to prevent binding of the lift pins 232 that may occur if the end thereof is allowed to contact the curved surface of the second transmission member 210. The stand-offs 234 may be made of an optically transparent material, such as quartz, to allow energy from the lamps 204 to pass therethrough.

The susceptor 206, while located in the processing position, divides the internal volume of the process chamber 130a into a process gas region 236 that is above the susceptor 206, and a purge gas region 238 below the susceptor 206. The susceptor 206 is rotated during processing by the rotary actuator 222 to minimize the effect of thermal and process gas flow spatial anomalies within the process chamber 130a and thus facilitates uniform processing of the substrate 202. The susceptor 206 may rotate at between about 5 RPM and about 100 RPM, for example, between about 10 RPM and about 50 RPM. The susceptor 206 is supported by the stem 218, which is generally centered on the susceptor 206 and facilitates movement of the susceptor 206 substrate 202 in a vertical direction (Z direction) during substrate transfer, and in some instances, processing of the substrate 202.

In general, the central portion of the first transmission member 208 and the central portion of the second transmission member 210 are formed from an optically transparent material such as quartz. The thickness and the degree of curvature of the first transmission member 208 may be selected to provide a flatter geometry for uniform flow in the process chamber.

One or more lamps, such as an array of the radiant heating lamps 204, can be disposed adjacent to and beneath the second transmission member 210 in a specified manner around the stem 218. The radiant heating lamps 204 may be independently controlled in zones in order to control the temperature of various regions of the substrate 202 as the process gas passes thereover, thus facilitating the deposition of a material onto the upper surface of the substrate 202. While not discussed here in detail, the deposited material may include silicon, doped silicon, germanium, doped germanium, silicon germanium, doped silicon germanium, gallium arsenide, gallium nitride, or aluminum gallium nitride.

The radiant heating lamps 204 may include a radiant heat source, depicted here as a lamp bulb 241, and may be configured to heat the substrate 202 to a temperature within a range of about 200 degrees Celsius to about 1,600 degrees Celsius. Each lamp bulb 241 can be coupled to a controller 250. The controller 250 includes power distribution board, such as printed circuit board (PCB) 252, memory 255, and support circuits 257. The controller 250 may supply power to each lamp bulb 241, control a process gas supply source 251, control the purge gas source 262, control the vacuum pump 257, and control the measurement assembly 270. A standoff may be used to couple the lamp bulb 241 to the power distribution board, if desired, to change the arrangement of lamps. In one embodiment, the radiant heating lamps 204 are positioned within a lamphead 245 which may be cooled during or after processing by, for example, a cooling fluid introduced into channels 249 located between the radiant heating lamps 204.

In some embodiments, a liner 263 is disposed within the base ring 212 and surrounding the susceptor 206. The liner 263 is coupled to the base ring 212 and protects the inside surface of the base ring 212 during substrate processing. The process gas inlet 214, the gas outlet 216, and the purge gas inlet 264 are all disposed through the liner 263. In some embodiments, the liner 263 is a reflective liner.

Process gas supplied from the process gas supply source 251 is introduced into the process gas region 236 through the process gas inlet 214 formed in the sidewall of the base ring 212. The process gas inlet 214 is configured to direct the process gas in a generally radially inward direction. As such, in some embodiments, the process gas inlet 214 may be a cross-flow gas injector. The cross-flow gas injector is positioned to direct the process gas across a surface of the susceptor 206 and/or the substrate 202. During a film formation process, the susceptor 206 is located in the processing position, which is adjacent to and at about the same elevation as the process gas inlet 214, thus allowing the process gas to flow generally across the upper surface of the susceptor 206 and/or substrate 202. The process gas exits the process gas region 236 through the gas outlet 216 located on the opposite side of the process chamber 130a as the process gas inlet 214. Removal of the process gas through the gas outlet 216 may be facilitated by a vacuum pump 257 coupled thereto. In some embodiments, there are multiple process gas inlets 214 and multiple gas outlets 216. In some embodiments, there are five or more process gas inlets 214 disposed along the inner circumference of the base ring 212 and three or more gas outlets 216 disposed along the inner circumference of the base ring 212. Each of the process gas inlets 214 and the gas outlets 216 are parallel to one another and are configured to direct or receive process gas which flows along different portions of the substrate 202.

Purge gas supplied from a purge gas source 262 is introduced to the purge gas region 238 through the purge gas inlet 264 formed in the sidewall of the base ring 212. The purge gas inlet 264 is disposed at an elevation below the process gas inlet 214. The purge gas inlet 264 is configured to direct the purge gas in a generally radially inward direction. The purge gas inlet 264 may be configured to direct the purge gas in an upward direction. During a film formation process, the susceptor 206 is located at a position such that the purge gas flows generally across a back side of the susceptor 206. The purge gas exits the purge gas region 238 and is exhausted out of the process chamber 130a through the gas outlet 216 located on the opposite side of the process chamber 130a as the purge gas inlet 264.

The measurement assembly 270 enables accurate measurement of the temperature of the substrate 202. Substrate temperature is measured by non-contact temperature sensors 272, 278 configured to measure temperature at the device side 258 of the substrate 202 and the bottom side 253 of the substrate 202. The measurement assembly 270 further includes light source 274 and the band edge detector 276. Each of a first non-contact temperature sensor 272, the light source 274, and the band edge detector 276 are disposed above the substrate 202. A second non-contact temperature sensor 278 is disposed below the substrate 202 and within the lamphead 245. The non-contact temperature sensors 272, 278 may be pyrometers disposed in ports formed in the chamber lid 254 or the lamphead 245.

The light source 274 is a laser light source with a controlled intensity and wavelength range. In some embodiments, a broad band light source is utilized. The light source 274 may be a diode laser or an optical cable. When the light source 274 is an optical cable, the optical cable is connected to an independent light source, which may be disposed near the process chamber. The light source 274 may alternatively be a bundle of lasers or optical cables, such that a plurality of light beams are focused into a first calibration light beam 286. In some embodiments, the light source 274 can emit radiation at a varying wavelength range. The varying wavelength range allows the light source 274 to emit wavelengths which would be within about 200 nm of the expected absorption edge wavelength of the calibration substrate. The use of a varying wavelength range eliminates noise which may be caused by the use of a wider wavelength spectrum and allows for an increase in the strength of emission of the narrower range from the light source 274 to increase the signal strength received by the band edge detector 276. In some embodiments, one or more of the radiant heating lamps 204 are utilized as the light source 274, and the light source 274 is disposed between the chamber lid 254 and the first transmission member 208. In some embodiments, the light source 274 may be classified as a radiation source, such as a thermal radiation source or a broad band radiation source. The radiation source may be a laser diode or an optical assembly. The optical assembly may include a laser, a lamp, or a bulb as well as a plurality of lenses, mirrors, or a combination of lenses and mirrors.

The band edge detector 276 measures the intensity of different wavelengths of light within a second calibration light beam 284, which is reflected off the calibration substrate 350. The band edge detector 276 is configured to find a wavelength at which the calibration substrate 350 transitions from absorbing a wavelength of radiation to reflecting nearly all of a wavelength of radiation. The band edge detector 276 may include several optical components disposed therein in order to separate and measure the second calibration light beam 284. In some embodiments, the band edge detector 276 is a scanning band edge detector and scans through a range of wavelengths to determine the transition wavelength at which the calibration substrate 350 transitions from absorbing to reflecting radiation. In some embodiments, the band edge detector 276 measures the intensity of wavelengths of light transmitted through a calibration substrate 350 (described below) from the susceptor 206. As described above, in some instances the susceptor 206 serves as a radiation source. The intensity of wavelengths of the radiation emitted by the susceptor 206 and transmitted through the calibrations calibration substrate 350 or a substrate 202 may be measured by the band edge detector 276. The band edge detector 276 then determines a wavelength at which the calibration substrate 350 transitions from absorbing wavelengths to transmitting wavelengths. An optional filter may be placed between the band edge detector 276 and the susceptor and configured to filter out radiation emitted by the lamp bulbs 241.

In some embodiments, a second band edge detector is disposed below the susceptor 206. The second band edge detector may be in a similar position as the second non-contact temperature sensor 278 and/or may replace or be combined with the second non-contact temperature sensor 278. The second band edge detector is similar in structure to the first band edge detector 276, but calibrates the second non-contact temperature sensor 278 by measuring the intensity of the wavelengths transmitted through the calibration substrate 350 through a lower window disposed within the susceptor 206. The second non-contact temperature sensor 278 and the second band edge detector are both represented herein by the second non-contact temperature sensor 278, but it is generally understood that the second band edge detector and the second non-contact temperature sensor 278 may have a similar spatial relationship as that shown between the band edge detector 276 and the first non-contact temperature sensor 272.

During the calibration methods disclosed herein, the substrate 202 is replaced with a calibration substrate 350. The calibration substrate 350 is similar in size and shape as the substrate 202. The calibration substrate 350 includes a top side 358 and a bottom side 353. The top side 358 is similar to the device side 258 of the substrate 202 and the bottom side 353 is similar to the bottom side 253 of the substrate 202. The calibration substrate 350 may be made of a variety of crystal structure materials. Exemplary materials and compounds which may form the calibration substrate 350 include Si, Ge, SiC, GaN, GaAs, AlN, InN, 3C—SiC, or InP material. Different materials with different crystal structures are known to have different band gaps with different temperature ranges. In embodiments described herein, a calibration substrate 350 formed from a crystalline SiC material is beneficial as the crystalline SiC material has an absorption edge wavelength which is easily measured using current band edge detection technology for temperatures between about 300° C. and about 1200° C. The band gap can be measured by determining the wavelength at which radiation transitions from being absorbed by the material to reflected by the material.

The calibration substrate 350 is formed from a single material or compound, as introducing additional materials/compounds may cause multiple band gaps to be measured by the band edge detector 276. In some embodiments, the calibration substrate 350 has a concentration of a single compound or material greater than about 95%, such as greater than 98%, such as greater than 99%, such as greater than 99.9%, such as greater than 99.99%, such as greater than 99.999%. The calibration substrate 350 is a crystalline material and non-crystalline material is minimized to improve band gap edge detection. Using a calibration wavelength with a high percentage of a single material also increases thermal uniformity within the calibration substrate 350. Thermal uniformity improved the accuracy of a comparison between the temperature measurements of the first and second non-contact temperature sensors 272, 278 and the band edge detector 276 when each of the measured temperatures are from slightly different positions along the surface of the calibration substrate 350.

Figure 5:
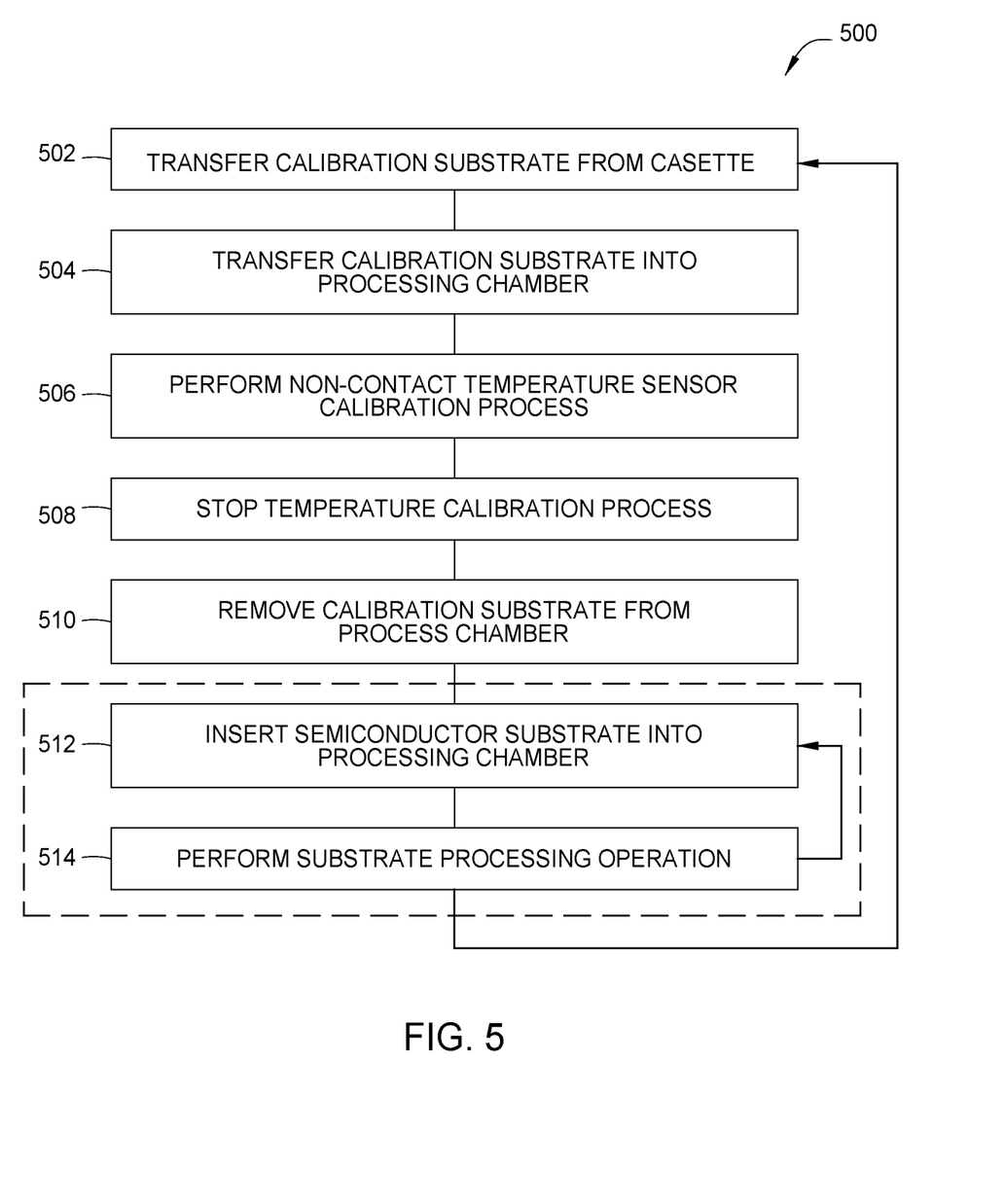
FIG. 5 is a method of utilizing the measurement assembly within the process chamber of FIG. 2, according to one embodiment.
Figure 6:
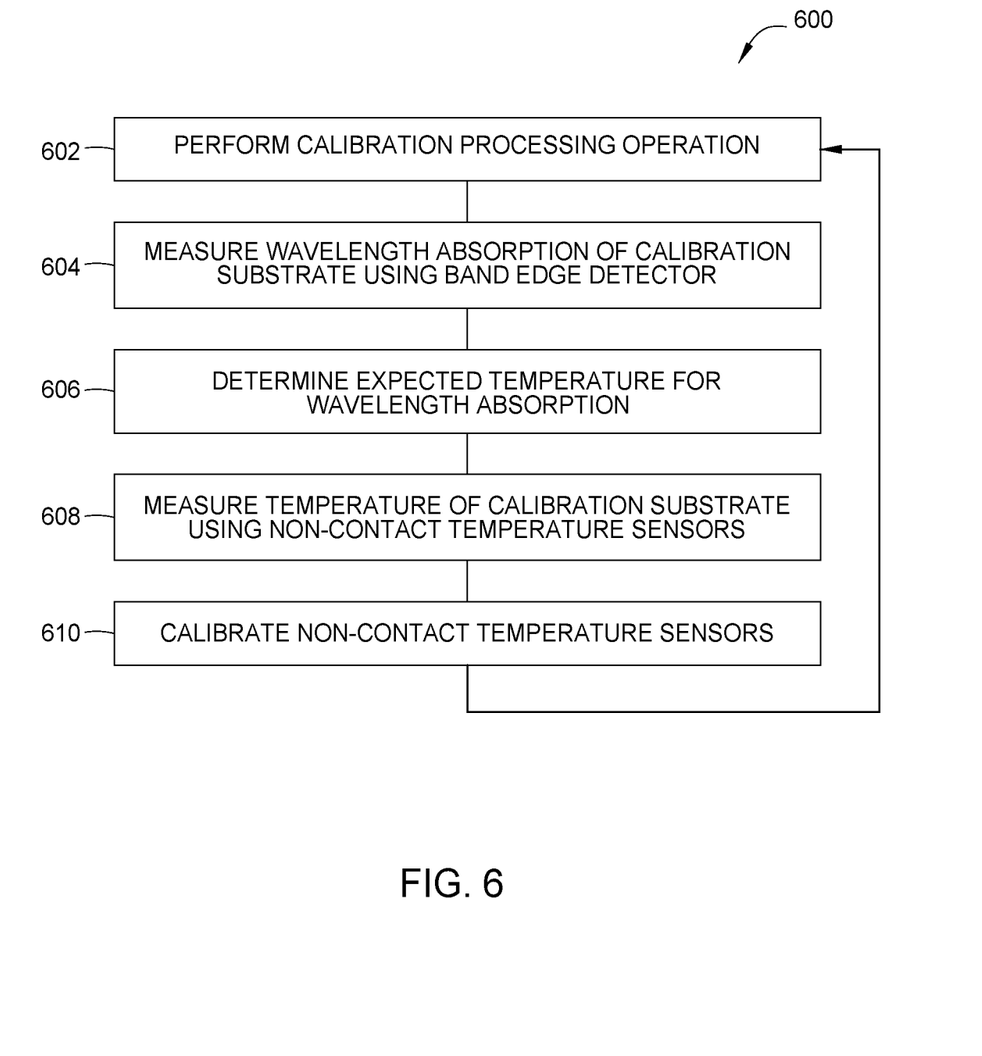
FIG. 6 is a method of calibrating non-contact temperature sensors within the process chamber of FIG. 2, according to one embodiment.

During calibration of the first and second non-contact temperature sensors 272, 278, a first measurement radiation path 282 of the first non-contact temperature sensor 272 is disposed between the first non-contact temperature sensor 272 and the top side 358 of the calibration substrate 350. A second measurement radiation path 288 of the second non-contact temperature sensor 278 is disposed between the second non-contact temperature sensor 278 and the bottom side 353 of the calibration substrate 350. The first calibration light beam 286 is emitted by the light source 274 and strikes the top side 358 of the calibration substrate 350 before being reflected as the second calibration light beam 284 and received by the band edge detector 276. The band edge detector 276 analyzes the wavelengths of the second calibration light beam 284 and determines an actual temperature of the calibration substrate 350. The method in which the actual temperature of the calibration substrate 350 is determined is described herein (FIGS. 5 and 6). The actual temperature of the calibration substrate 350 is compared to the temperatures measured by the first and second non-contact temperature sensors 272, 278 to facilitate calibration of the first and second non-contact temperature sensors 272, 278.

The chamber lid 254 may be a reflector and optionally placed outside the first transmission member 208 to reflect infrared (IR) light that is radiating off the substrate 202 and redirect the energy back onto the substrate 202. The chamber lid 254 may be secured above the first transmission member 208 using a clamp ring 256. The chamber lid 254 can be made of a metal such as aluminum or stainless steel. The measurement assembly 270 is disposed through the chamber lid 254 to receive radiation from the device side 258 of the substrate 202.

Figure 3:
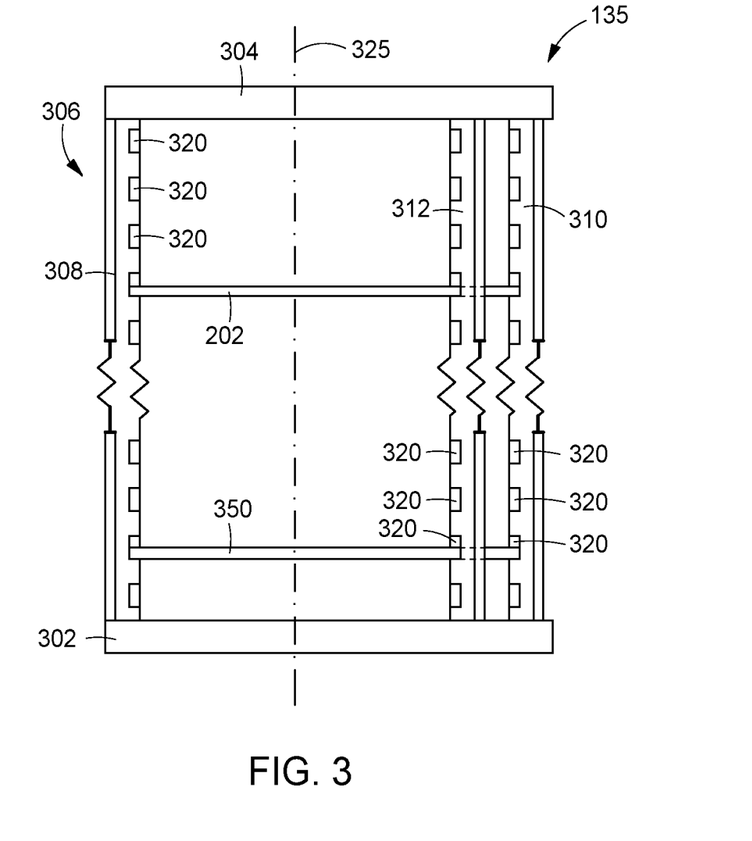
FIG. 3 is a schematic side view of a cassette used within a load lock chamber of the substrate processing system of FIG. 1, according to one embodiment.

FIG. 3 is a schematic side view of a cassette 135 used within a load lock chamber 120a, 120b of the substrate processing system 100 of FIG. 1, according to one embodiment. The cassette 135 is used to store substrates, such as the substrates 202 while the substrates are not being processed within the process chambers 130a-d. The cassette 135 includes an upper member 304, a lower member 302, and a plurality of support members 306.

The upper member 304 and the lower member 302 are disk shaped and have the same diameter. The diameters of the upper member 304 and the lower member 302 are about 305 mm to about 325 mm when a 300 mm substrate is stored within the cassette 135. The diameters of the upper member 304 and the lower member 302 are about 10 mm to about 25 mm, such as about 10 mm to about 15 mm larger than the outer diameter of the substrates 202.

The plurality of support members 306 are vertically disposed and configured to hold substrates, such as the substrate 202, as well as the calibration substrate 350. The support members 306 are disposed between the upper member 304 and the lower member 302. The support members 306 are coupled to each of the upper member 304 and the lower member 302. The support members 306 include a first support member 308, a second support member 310, and a third support member 312. Each of the first, second, and third support members 308, 310, 312 include a plurality of ledges 320 disposed therein. The ledges 320 within each of the first, second, and third support members 308, 310, 312 face radially inward towards a central axis 325 of the cassette 135.

Each of the first, second, and third support members 308, 310, 312 have 20 to 50 ledges, such as about 25 to 40 ledges for supporting substrates, such as substrate 202 and calibration substrate 350. In some embodiments, the cassette 135 has 28 ledges disposed in each of the first, second, and third support members 308, 310, 312, so that at least one calibration substrate 350 can be stored within the cassette 135 along with 25 device substrates 202. The substrates 202 and the calibration substrate 350 are held in a horizontal position while stored in the cassette 135 and are contacted at an outer edge by the ledges 320 from each of the first, second, and third support members 308, 310, 312.

Figure 4:
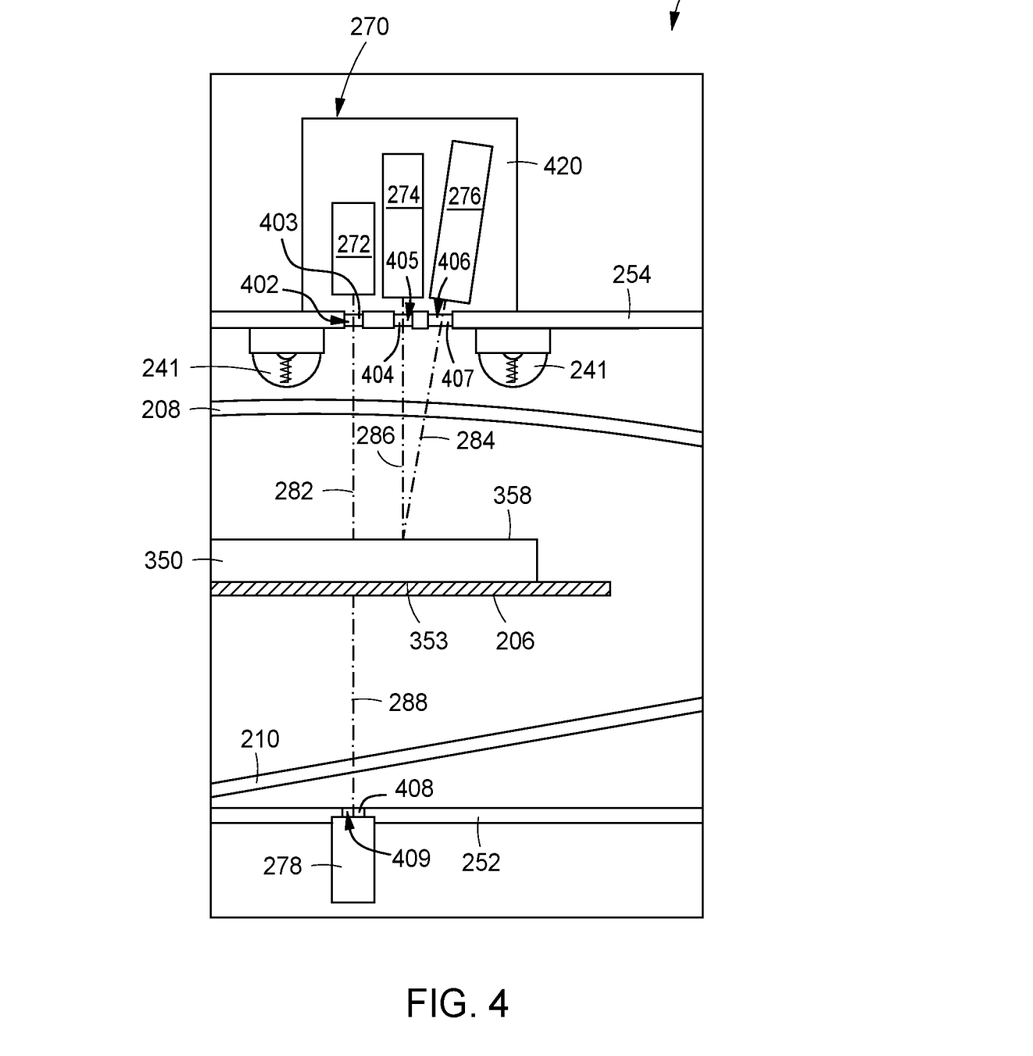
FIG. 4 is a schematic sectional view of the measurement assembly used within the process chamber of FIG. 2, according to one embodiment.

FIG. 4 is a schematic sectional view of the measurement assembly 270 used within the process chamber 130a of FIG. 2, according to one embodiment. In addition to the components described with regard to FIG. 2, the measurement assembly 270 of FIG. 4 further includes a first window 403, a second window 408, a third window 404, a fourth window 407, and a cover 420.

The first window 403 is disposed within a first opening 402. The first window 403 is disposed between the first non-contact temperature sensor 272 and the first transmission member 208. Therefore, the first window 403 is disposed between the first non-contact temperature sensor 272 and the calibration substrate 350. The first window 403 is a quartz window and allows for radiation from within the process chamber 130a to pass therethrough. The first window 403 may filter radiation emitted by the calibration substrate 350 to allow only wavelengths which the first non-contact temperature sensor 272 measures. The radiation traveling along the first measurement radiation path 282 travels between the top side 358 of the calibration substrate 350 and the first non-contact temperature sensor 272. The first measurement radiation path 282 intersects both the first transmission member 208 and the first window 403. In some embodiments, which may be combined with other embodiments, the first measurement radiation path 282 may intersect the top side 358 of the calibration substrate 350 at any radial position along the calibration substrate 350. In some embodiments, the first measurement radiation path 282 intersects the top side 358 of the calibration substrate 350 at a specific location, such as either less than 15 mm from the center of the substrate, such as less than 10 mm from the center of the substrate, such as less than 5 mm from the center of the substrate or the first measurement radiation path 282 intersects the top side 358 of the calibration substrate 350 at a radius of about 110 mm to about 130 mm, such as about 115 mm to about 125 mm, such as about 120 mm.

The second window 408 is disposed within a second opening 409. The second window 408 is disposed between the second non-contact temperature sensor 278 and the second transmission member 210. Therefore, the second window 408 is disposed between the second non-contact temperature sensor 278 and the calibration substrate 350. The second window 408 is a quartz window and allows for radiation from within the process chamber 130a to pass there through. The second window 408 may filter radiation emitted by the calibration substrate 350 to allow only wavelengths which the second non-contact temperature sensor 278 measures. The radiation traveling along the second measurement radiation path 288 travels between the bottom side of the susceptor 206 and the second non-contact temperature sensor 278. The second measurement radiation path 288 intersects both the second transmission member 210 and the second window 408. In some examples, the second measurement radiation path 288 may intersect the bottom side of the susceptor 206 at any radial position along the calibration substrate 350. In other examples, the second measurement radiation path 288 intersects the bottom side of the susceptor 206 at a specific radial position, such as a radial position directly below the calibration substrate 350 and either less than 15 mm from the center of the substrate, such as less than 10 mm from the center of the substrate, such as less than 5 mm from the center of the substrate or the second measurement radiation path 288 intersects the bottom side of the susceptor 206 at a radial position directly below the calibration substrate 350 at a radius of about 110 mm to about 130 mm, such as about 115 mm to about 125 mm, such as about 120 mm.

The third window 404 is disposed within a third opening 405. The third window 404 is disposed between the light source 274 and the first transmission member 208. Therefore, the third window 404 is disposed between the light source 274 and the calibration substrate 350. The third window 404 allows light emitted by the light source 274 to pass there through. The light emitted by the light source 274 and traveling along the first calibration light beam 286 is disposed between the light source 274 and the top side 358 of the calibration substrate 350. The first calibration light beam 286 passes through both of the first transmission member 208 and the third window 404. The first calibration light beam 286 may intersect the top side 358 of the calibration substrate 350 at any radial position along the calibration substrate 350. In some examples, the first calibration light beam 286 intersects the top side 358 of the calibration substrate 350 either less than 15 mm from the center of the substrate, such as less than 10 mm from the center of the substrate, such as less than 5 mm from the center of the substrate or the first calibration light beam 286 intersects the top side 358 of the calibration substrate 350 at a radius of about 110 mm to about 130 mm, such as about 115 mm to about 125 mm, such as about 120 mm.

The first calibration light beam 286 intersects the top side 358 of the calibration substrate 350 within less than 5 mm, such as less than 2 mm, such as less than 1 mm from the location in which the first measurement radiation path 282 intersects the radiation path. In some embodiments, the first calibration light beam 286 intersects the top side 358 of the calibration substrate 350 at the same radial position as the first measurement radiation path 282. Measuring the calibration substrate 350 at the same location allows for a direct comparison between temperature measurements and reduces error when compared to measurements made at different radial distances from the center of the calibration substrate 350.

The fourth window 407 is disposed within a fourth opening 406 formed through the chamber lid 254. The fourth window 407 is disposed between the band edge detector 276 and the first transmission member 208. Therefore, the fourth window 407 is also disposed between the band edge detector 276 and the calibration substrate 350.

The light received by the band edge detector 276 and traveling along the second calibration light beam 284 is disposed between the band edge detector 276 and the top side 358 of the calibration substrate 350. The second calibration light beam 284 passes through both of the first transmission member 208 and the fourth window 407. The second calibration light beam 284 intersects the top side 358 of the calibration substrate 350 at the same location as the first calibration light beam 286. The second calibration light beam 284 is a reflection of the first calibration light beam 286 off the top side 358 of the calibration substrate 350. The second calibration light beam 284 is altered by intersecting the calibration substrate 350 and has a reduced wavelength range that is measured by the band edge detector 276.

The cover 420 is disposed above the chamber lid 254 and surrounds the first non-contact temperature sensor 272, the light source 274, and the band edge detector 276. The cover 420 may alternatively be disposed around each of the first non-contact temperature sensor 272, the light source 274, and the band edge detector 276 individually, such that there are a plurality of covers 420. The cover 420 may serve as a support to hold each of the first non-contact temperature sensor 272, the light source 274, and the band edge detector 276 in place. The cover 420 prevents radiant energy from escaping the process chamber 130a and interfering with other equipment.

The temperature of a portion of the susceptor 206 is measured using the second non-contact temperature sensor 278. The portion of the susceptor 206 measured using the second non-contact temperature sensor 278 is a bottom surface and disposed opposite the location at which the calibration substrate 350 is measured by the first non-contact temperature sensor 272.

FIG. 5 is a method 500 of utilizing the measurement assembly 270 within the process chamber 130a of FIG. 2, according to one embodiment. The method 500 includes a first operation 502, a second operation 504, a third operation 506, a fourth operation 508, a fifth operation 510, a sixth operation 512, and a seventh operation 514. Each of the operations 502, 504, 506, 508, 510, 512, and 514 are performed sequentially as shown in FIG. 5 and described herein.

The method 500 includes a first operation 502 of transferring a calibration substrate, such as the calibration substrate 350 from a cassette, such as the cassette 135 (FIG. 3). The calibration substrate 350 is stored within the cassette between each calibration of the first and second non-contact temperature sensors 272, 278 (FIG. 4). The calibration substrate 350 is removed from the cassette by the transfer robot 115 within the transfer chamber 110 (FIG. 1).

During the second operation 504, the transfer robot transfers the calibration substrate into the processing chamber, such as the processing chamber 130a or any of the other processing chambers 130b, 130c, 130d (FIGS. 1 and 2). The calibration substrate passes through the transfer chamber 110 before being inserted into the processing chamber through a loading port, such as the loading port 125 (FIG. 2). The calibration substrate is placed onto a susceptor and the transfer robot is retracted from the process chamber.

During the third operation 506, a calibration process is performed. The calibration process includes utilizing the calibration substrate and the measurement assembly 270. The calibration process of the third operation 506 is described in greater detail with reference to the method 600 of calibrating the non-contact temperature sensors.

After the third operation 506, the temperature calibration process is stopped in a fourth operation 508. Stopping the temperature calibration process includes stopping the flow of any process gases introduced into the process chamber, stopping of any heating of the calibration substrate, and ceasing of the measurement of the temperature of the calibration substrate.

After the temperature calibration process is ceased, the calibration substrate is removed from the process chamber during a fifth operation 510. The calibration substrate is removed by the transfer robot through the loading port. The calibration substrate is inserted back into the cassette subsequent to being removed from the process chamber.

After removal of the calibration substrate from the process chamber, a semiconductor substrate may be transferred into the process chamber during the sixth operation 512. The semiconductor substrate may be similar to the substrate 202 (FIG. 1). The semiconductor substrate may have partially formed semiconductor devices disposed thereon. The semiconductor substrate is transferred into the process chamber by the transfer robot and may have been stored within the cassette during the temperature calibration process or may have been stored in a separate process chamber.

Subsequent to the sixth operation 512 of transferring a semiconductor substrate into the process chamber, a substrate processing operation is performed during the seventh operation 514. The substrate processing operation may include a deposition process on the top surface of the substrate. The substrate processing operation may further include heating the substrate, introducing at least one process gas, introducing a purge gas, and evacuating the process and purge gases. A plurality of substrates are processed during the substrate processing operation.

The sixth and seventh operations 512, 514 are repeated so that between each calibration process multiple substrates are processed. The sixth and seventh operations 512, 514 may be repeated, such that more than 50 substrates are processed within the processing chamber between each calibration process. In some embodiments, the calibration process is only performed once every several days and several hundred substrates are processed within the processing chamber between each calibration process.

The method 500 is repeated automatically after a preset amount of substrates have been processed within the processing chamber or after the processing chamber has reached a preset run time. The method 500 is automated and programmed into a controller, such as the controller 250. The method 500 does not use human intervention and is completed without disassembly of the process chambers. The calibration of the non-contact temperature sensors using the method 500 requires minimum downtime of the system by only pausing processing operations for the length of time it takes to perform operations 504, 506, 508, and 510.

FIG. 6 is a method 600 of calibrating non-contact temperature sensors, such as the non-contact temperature sensors 272, 278, within the process chamber of FIG. 2, according to one embodiment. The method 600 is part of the third operation 506 of the method 500 described herein. Calibrating the non-contact temperature sensors includes a first operation 602, a second operation 604, a third operation 606, a fourth operation 608, and a fifth operation 610. The operations 602, 604, 606, 608, 610 described with regard to the method 600 are performed subsequently as shown in FIG. 6 and described herein.

The first operation 602 includes performing a calibration processing operation. The calibration processing operation may be similar to the substrate processing operation 514 performed on the regular substrate. The calibration processing operation includes heating the substrate, introducing a process gas, introducing a purge gas, and evacuating the process and purge gases. The process gas may be different from the process gas utilized in the substrate processing operation of the seventh operation 514 of the method 500. A process gas may be a carrier gas, such as a $H_2$ gas. The carrier gas assists in matching process conditions with those found in the substrate processing operation 514. The carrier gas assists in matching the pressure and gas flow which would be found during the substrate processing operation

514. However, the process gas does not include reactant gases or deposition/etch gases, which may alter the surface of the calibration wafer. The process chamber and calibration substrate may be heated using the radiant heating lamps 204 (FIG. 2) and/or a susceptor heater (not shown). The heating of the process chamber and the calibration substrate is performed gradually and the temperature increases over time.

The second operation 604 includes measuring a wavelength of absorption of the calibration substrate using the band edge detector 276 (FIG. 4). During the second operation 604 a first calibration light beam 286 is emitted by the light source 274 or one of the radiant heating lamps 204. When the first calibration light beam 286 strikes the top side 358 of the calibration substrate 350 at a first location, a first wavelength range of the first calibration light beam 286 is absorbed by the calibration substrate 350 while a second wavelength range of the first calibration light beam 286 is reflected as the second calibration light beam 284. The second calibration light beam 284 enters the band edge detector 276. The band edge detector 276 measures the intensity of a variety of wavelengths within the wavelength spectrum of the second calibration light beam 284. The band edge detector 276 maps the intensity of the wavelength measurements over the wavelength range measured by the band edge detector 276. Either a broad band light source, such as the light source 274 is utilized to form the first calibration light beam 286, or one or more radiant heating lamps 204 is used to form the first calibration light beam 286. The light source 274 may be beneficially utilized in order to improve the accuracy of the measurement. The light source 274 may emit a precise range of wavelengths at a set intensity and direction. This makes the light source 274 highly adjustable and may provide for improved measurement precision. The radiant heating lamps 204 may be used to reduce the number of components disposed on a lid of the process chamber. The radiant heating lamps 204 emit a range of light which may be similar to the range emitted by the light source 274. The radiant heating lamps 204 have a controlled intensity. The radiant heating lamps 204 may be used to emit light which is absorbed and reflected by the calibration substrate 350.

In some embodiments, which may be combined with other embodiments, radiation is transmitted through the calibration substrate and measured by the band edge detector 276 on the opposite side of the calibration substrate 350 from the radiation light source. This may occur when a susceptor on which the calibration substrate 350 is disposed is transparent to the light emitted by the light source at a wavelength detected by the band edge detector 276 or when the susceptor itself emits radiation after heating.

The band edge detector 276 may measure the intensity of wavelengths between about 250 nanometers (nm) to about 1350 nm, such as about 300 nm to about 1300 nm. The light sources (either the light source 274 or the radiant heating lamps 204) may emit light at a wavelength of about 250 nm to about 1350 nm, such as about 300 nm to about 1300 nm.

Figure 7:
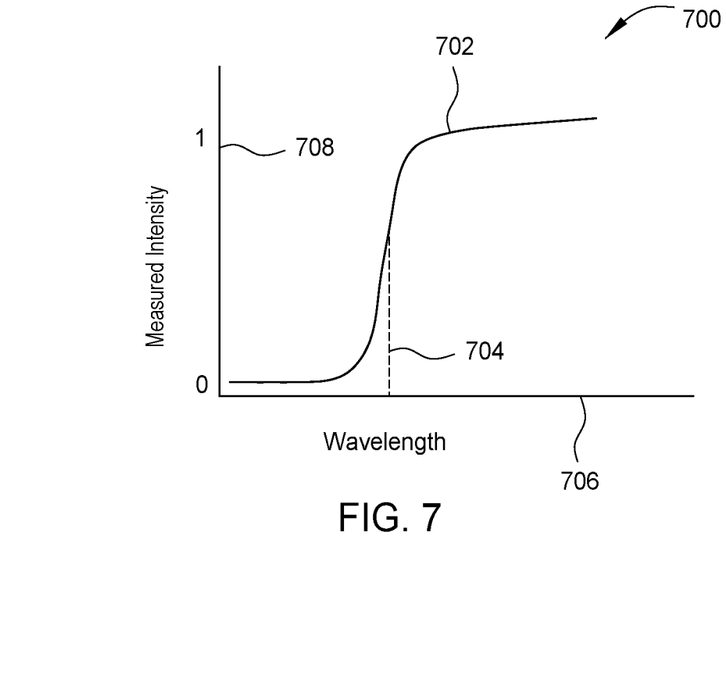
FIG. 7 is a graph illustrating absorption wavelength detection, according to one embodiment.

An exemplary map of the intensity of the wavelength measurements is found in FIG. 7. FIG. 7 shows the measurement of the intensity 708 of wavelengths over a range of wavelengths 706. The range of wavelengths 706 measured by the band edge detector 276 may be the same range of wavelengths emitted by the light source 274 as the first calibration light beam 286. The intensity 708 of the wavelengths over the range of wavelengths 706 is mapped to form an intensity curve 702. The intensity curve 702 shows a sharp change between the wavelength range which is absorbed by the calibration substrate 350, the wavelength range having a low or near zero measured intensity, and the wavelength range which is reflected by the calibration substrate 350, the wavelength range having a high or near 1 measured intensity. The intensity is measured as a fraction of the intensity of the wavelength emitted by the light source 274. The absorption edge wavelength is disposed in the midpoint 704 of the transition between low measured intensity and high measured intensity of the wavelength range. The absorption edge wavelength is the wavelength at which the wavelengths transition from being absorbed to being reflected by a material. The absorption edge wavelength is directly correlated to the band gap of a material and the band gap of a material is dependent upon the temperature of the material. As temperature changes within an object, such as the calibration substrate 350, the band gap and thus the absorption edge wavelength also changes. Therefore, a temperature of a material can be measured by measuring the absorption edge wavelength.

Figure 8:
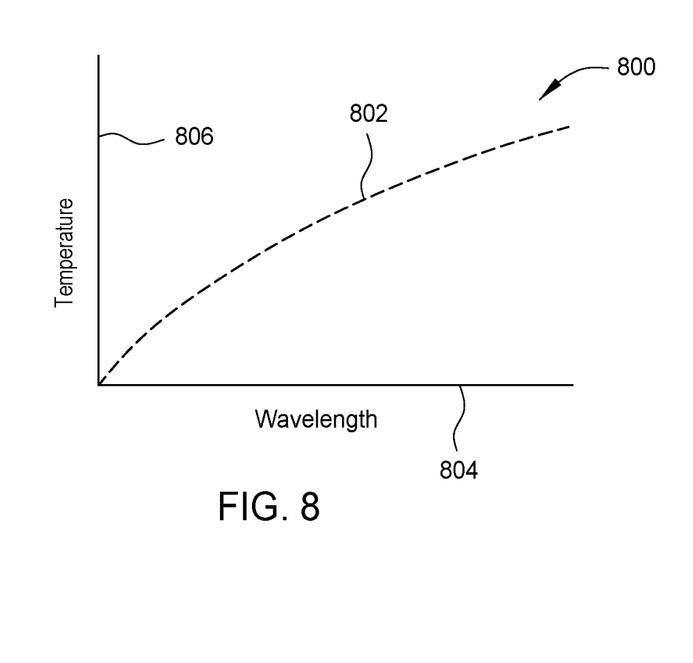
FIG. 8 is a graph illustrating the correlation between absorption wavelength and temperature, according to one embodiment.

Returning to FIG. 6, in the third operation 606, the band edge detector 276 determines the temperature of the calibration substrate based off of the absorption edge wavelength found in the second operation 604. A graph such as the correlated temperature graph 800 is utilized to equate the absorption edge wavelength with a temperature. The correlation curve 802 of the correlated temperature graph 800 may be found experimentally and correlates temperature 806 to the measured absorption edge wavelength 804. The temperature determined by the band edge detector 276 using the absorption edge wavelength is beneficial in that the determined temperature is not influenced by the aging of any components within the process chamber, such as the process chamber 130a of FIG. 2. The absorption edge wavelength is dependent upon temperature and the material of the calibration substrate 350, but is minimally influenced by the state of the components within the process chamber. Therefore, since the same calibration substrate 350 is utilized and stored between each of the calibration processes, an accurate and repeatable actual temperature is able to be performed using the measurement assembly 270 and the band edge detector 276. The actual temperature is the temperature measured by the band edge detector 276.

In the fourth operation 608 the temperature of the calibration substrate 350 is determined using the first and second non-contact temperature sensors described herein. The temperature of the first and second non-contact temperature sensors is determined by measuring the radiation emitted by the calibration substrate 350. In some embodiments, the non-contact temperature sensors are pyrometers. The temperature measured by the first non-contact temperature sensor is a first temperature, or a first measured temperature. The temperature measured by the second non-contact temperature sensor is a second temperature, or a second measured temperature. The areas of the calibration substrate 350 which are measured by the first and second non-contact temperature sensors are within about 5 mm of the radial position of the area measured by the band edge detector. In some embodiments, each of the first and second non-contact temperature sensors measure an area with the same radius as the area measured by the band edge detector. In some embodiments, the area is also called a measurement point.

In some embodiments, the second and fourth operations 604, 608 are performed simultaneously to ensure the temperatures measured are equivalent. In some embodiments, all of the second, third, and fourth operations 604, 606, and 608 are performed simultaneously.

Over time, the temperature measurements of the first and second non-contact temperature sensors drifts due to aging and wear of components within the process chamber. Therefore, the temperature measurements of the non-contact temperature sensors should be calibrated periodically. In the fifth operation 610, the non-contact temperature sensors are calibrated using the actual temperature determined by the band edge detector. The non-contact temperature sensors may be adjusted to a temperature matching or near (within a predetermined degree of accuracy) the temperature measured by the band edge detector.

In some embodiments, the method 600 of calibrating non-contact temperature sensors described herein is performed multiple times at a variety of temperatures so that the first and second non-contact temperature sensors may be calibrated to a wide range of temperatures. In some embodiments an adjustment algorithm can determine an optimum calibration amount for the non-contact temperature sensors after the method 600 has been repeated over a range of calibration substrate temperatures. The non-contact temperature sensors may be calibrated by adjusting each measurement by the same amount, or the non-contact temperature sensors may be adjusted on a curve determined by the controller.

The embodiments disclosed herein relate to the calibration of non-contact temperature sensors within a thermal processing chamber, such as an epitaxial processing chamber, using a band edge detector and absorption edge wavelengths. A calibration substrate is utilized to better enable consistent calibration results and provide an expected absorption edge wavelength for the material from which the calibration substrate is formed.

While the foregoing is directed to embodiments of the present disclosure, other and further embodiments of the disclosure may be devised without departing from the basic scope thereof, and the scope thereof is determined by the claims that follow.

What is claimed is:

1. A measurement assembly for calibrating at least one pyrometer within a processing chamber and configured for use during semiconductor processing, comprising:
    a calibration substrate;
    a band edge calibration assembly comprising:
        a radiation source positioned to emit a radiation and configured to irradiate a portion of the calibration substrate positioned on a substrate support within a chamber body of the processing chamber; and
        a band edge detector disposed adjacent to the radiation source and positioned to receive the radiation emitted by the radiation source, the band edge detector configured to determine a band gap of a substrate; and
    a first pyrometer disposed adjacent to the band edge calibration assembly and positioned to receive radiation,
        wherein the band edge detector is configured to measure a wavelength at which the calibration substrate transitions from absorbing radiation to transmitting radiation emitted by the radiation source,
        wherein the calibration substrate is disposed in a path of the radiation, wherein the radiation is reflected off of the calibration substrate before being received by the band edge detector, and
        wherein the calibration substrate is configured to be stored in a cassette outside of the chamber body.

2. The measurement assembly of claim 1, wherein the calibration substrate is a Si, Ge, SiC, GaN, GaAs, AlN, InN, 3C—SiC, or InP material.

3. The measurement assembly of claim 2, wherein the calibration substrate is a crystalline SiC material.

4. The measurement assembly of claim 1, wherein the band edge detector is a scanning band edge detector.

5. The measurement assembly of claim 4, wherein the band edge detector is configured to measure an intensity of light over a range of wavelengths.

6. The measurement assembly of claim 1, wherein the radiation source is a broad band light source.

7. A process system, configured for use during semiconductor processing, comprising:
    a chamber body;
    a substrate support disposed within the chamber body;
    a plurality of lamps disposed on a first side of the substrate support and within the chamber body;
    a first transmission member disposed on the first side of the substrate support between the plurality of lamps and the substrate support;
    a second transmission member disposed on a second side of the substrate support and within the chamber body;
    a calibration substrate; and
    a band edge calibration assembly coupled to the chamber body and comprising:
        a radiation source positioned to direct radiation onto or through the substrate support and the calibration substrate when the calibration substrate is disposed on the substrate support;
        a band edge detector disposed adjacent to the radiation source and positioned to receive radiation emitted by the radiation source, the band edge detector configured to determine a band gap of a substrate; and
        a first pyrometer disposed adjacent to the band edge calibration assembly and positioned to receive radiation,
            wherein the radiation source is disposed adjacent to the band edge detector and a first window is between the radiation source and the calibration substrate while a second window is disposed between the first pyrometer and the calibration substrate.

8. The process system of claim 7, further comprising a second pyrometer disposed on an opposite side of the substrate support from the first pyrometer and the band edge detector.

9. The process system of claim 7, further comprising a load lock chamber comprising a cassette for storing the calibration substrate, wherein the calibration substrate is moveable between the cassette and the substrate support.

10. The process system of claim 7, wherein the band edge detector is configured to measure an intensity of radiation over a range of wavelengths and detect an absorption edge wavelength of the calibration substrate.

11. The process system of claim 7, wherein each of the first pyrometer, the band edge detector, and the radiation source are disposed within a cover coupled to an outside of the chamber body.

12. The process system of claim 7, wherein the radiation source, the band edge detector, and the first pyrometer are disposed on the first side of the substrate support.

13. The process system of claim 12, further comprising a second pyrometer disposed on the second side of the substrate support.

14. The process system of claim 13, further comprising a second band edge detector disposed on the second side of the substrate support.

15. A process system, configured for use during semiconductor processing, comprising:
- a chamber body;
- a substrate support disposed within the chamber body;
- a plurality of lamps disposed on a first side of the substrate support and within the chamber body;
- a first transmission member disposed on the first side of the substrate support between the plurality of lamps and the substrate support;
- a second transmission member disposed on a second side of the substrate support and within the chamber body;
- a calibration substrate;
- a band edge calibration assembly coupled to the chamber body and comprising:
  - a radiation source positioned to direct radiation onto or through the substrate support and configured to irradiate a portion of the calibration substrate when the calibration substrate is disposed on the substrate support;
  - a scanning band edge detector disposed adjacent to the radiation source and positioned to receive radiation emitted by the radiation source, the scanning band edge detector configured to determine an absorption edge wavelength of the calibration substrate after radiation from the radiation source has contacted the calibration substrate; and
  - a first pyrometer disposed adjacent to the scanning band edge detector and positioned to receive radiation;
- a transfer chamber coupled to the chamber body; and
- a load lock chamber coupled to the transfer chamber and comprising a cassette for storing the calibration substrate, wherein the calibration substrate is moveable between the cassette and the substrate support.

16. The process system of claim 15, wherein the calibration substrate is a Si, Ge, SiC, GaN, GaAs, AlN, InN, 3C—SiC, or InP material and has a concentration of a single material greater than about 95%.

17. The process system of claim 16, wherein the scanning band edge detector is configured to receive radiation reflected off of the calibration substrate.

18. The process system of claim 15, wherein the radiation source is disposed adjacent to the scanning band edge detector and a first window is disposed through a lid of the chamber body and between the radiation source and the first transmission member while a second window is disposed through the lid and between the first pyrometer and the first transmission member.

19. A process system configured for use during semiconductor processing, comprising:
- a chamber body;
- a substrate support disposed within the chamber body;
- a plurality of lamps disposed on a first side of the substrate support and within the chamber body;
- a first transmission member disposed on the first side of the substrate support between the plurality of lamps and the substrate support;
- a second transmission member disposed on a second side of the substrate support and within the chamber body;
- a calibration substrate;
- a band edge calibration assembly coupled to the chamber body and comprising:
  - a radiation source positioned to direct radiation onto or through the substrate support and the calibration substrate when the calibration substrate is disposed on the substrate support; and
  - a band edge detector disposed adjacent to the radiation source and positioned to receive radiation emitted by the radiation source, the band edge detector configured to determine a band gap of a substrate;
- a first pyrometer disposed adjacent to the band edge calibration assembly and positioned to receive radiation; and
- a second pyrometer disposed on the second side of the substrate support opposite from the first pyrometer and the band edge calibration assembly.

20. The process system of claim 19, further comprising a second band edge detector disposed on the second side of the substrate support.

* * * * *